| United States Patent [19] | | [11] | 3,990,977 |
|---|---|---|---|
| Pearson | | [45] | Nov. 9, 1976 |

[54] FIRE PROOFING SHAMPOO COMPOSITION AND METHOD

[76] Inventor: Glenn A. Pearson, 1311 Delaware Ave., SW., Washington, D.C. 20024

[22] Filed: Mar. 27, 1975

[21] Appl. No.: 562,912

[52] U.S. Cl. .............................. 252/8.1; 106/15 FP; 252/526
[51] Int. Cl.² ........................................... C09K 3/28
[58] Field of Search ..... 252/8.1, 526, 545, DIG. 13; 106/15 FP

[56] References Cited
UNITED STATES PATENTS

| 2,071,353 | 7/1935 | Morgan | 252/8.1 |
|---|---|---|---|
| 3,409,463 | 11/1968 | LeBlanc et al. | 106/15 FP |
| 3,577,342 | 5/1971 | Fidell | 106/15 FP |
| 3,676,389 | 7/1972 | Putnam et al. | 106/15 FP |
| 3,723,074 | 3/1973 | Sears et al. | 252/8.1 |
| 3,775,315 | 11/1973 | Smith et al. | 252/135 |
| 3,835,071 | 9/1974 | Allen et al. | 252/545 |
| 3,862,823 | 1/1975 | Green et al. | 252/545 |

*Primary Examiner*—Leland A. Sebastian
*Assistant Examiner*—David Leland
*Attorney, Agent, or Firm*—Lowe, King, Price & Markva

[57] ABSTRACT

A composition and method for cleaning and fire proofing substrates such as carpets, rugs and the like, by application of an aqueous composition containing an amine, phosphoric acid or equivalent inorganic acid, one or more fire proofing agents and a detergent.

4 Claims, No Drawings

FIRE PROOFING SHAMPOO COMPOSITION AND METHOD

BACKGROUND OF THE INVENTION

1. FIELD OF THE INVENTION

This invention relates to a shampoo composition and method for its use and more particularly to a shampoo composition particularly adapted for the cleaning of surfaces such as carpets, rugs and the like and the fire proofing of such surfaces.

DESCRIPTION OF THE PRIOR ART

Shampooing compositions are of course well known to the art and have been used in various applications. Included within such applications are the cleaning of textile surfaces such as carpets, rugs and the like to remove dirt, grit and grime from these surfaces. A large number of detergent compositions are disclosed in the art for use for this purpose with illustrative reference being U.S. Pat. No. 2,335,466.

In U.S. Pat. 3,734,686 there is disclosed a composition for cleaning carpets and pile fabrics in order to make the carpets abrasion resistant by application of an emulsion which leaves a polyethylene film on the carpet to resist abrasion. However, there is no disclosure for effecting fire proofing of the carpet.

Flame proofing or fire proofing compositions are also well known in the art and certain compositions of this type have been disclosed for the treatment of carpets and pile fabrics. Illustrative of compositions and methods of this type is U.S. Pat. 3,676,389 which discloses a flame proofing composition containing a foaming agent, a urea-ester mixture, a resin, and a catalyst and the application of this mixture to rugs and carpets. However, in this patent the carpet is flame proofed during its formation and not in combination with a cleaning agent or detergent.

U.S. Pat. No. 3,082,121 relates to flame proofing of cellulose acetate carpets and particularly to rendering such carpets flame proof by backsizing with a composition containing styrene butadiene latex, sulfur, zinc oxide, zinc dibutyldithiocarbamate, potassium oleate, a clay dispersion and a diamine and then spraying a sodium formate composition on the carpet face. However, the patent does not concern itself with the combination of fire proofing and shampooing.

The present invention is considered to be an improvement over these prior compositions and methods and to represent a significant advance in the art.

SUMMARY OF THE INVENTION

It is accordingly one object of the present invention to provide a composition suitable to effect the combination of shampooing and flame proofing of substrates.

A still further object of the invention is to provide a composition which is effective to clean and flame proof textile substrates such as rugs and carpets in place or without removing them from the surface on which they are being used.

A still further object of the invention is to provide a novel composition and method for use of the composition to effectively shampoo and flame proof textile substrates such as carpets and rugs.

An even further object of the invention is to provide a novel shampooing and flame proofing composition which is effective to treat rugs and carpets in place, to effect cleaning of the rugs and carpets and to apply an abrasion-resistant flame proofing film thereto.

Other objects and advantages of the present invention will become apparent as the description thereof proceeds.

In satisfaction of the foregoing objects and advantages there is provided by this invention an aqueous composition comprising an amine, an inorganic acid, one or more fire proofing agents and a detergent. There is also provided by this invention a method for use of the novel composition comprising placing an excess of the solution on the substrate sufficient to saturate the same, working the mixture in and allowing to dry.

DESCRIPTION OF THE PREFERRED EMBODIMENTS

As indicated above, this invention is concerned with an aqueous composition useful in the cleaning and fire proofing of substrates, and particularly textile substrates. Particular substrates to which the invention is directed are those formed of pile fabrics including carpets, rugs and the like.

It is well known, of course, that after a reasonable period of normal use, it is necessary that a substrate such as carpet be cleaned and this usually entails some type of water wash, dry foam or dry cleaning treatment. The soapy solution required to remove the spots and stains from the carpet simultaneously acts in a detrimental manner to entirely or partially remove any flame retardant material which had been coated on the carpet during its production. As a result, there will be left a carpet or rug which has lost a substantial amount of its flame proofing properties. Further, as additional cleanings with detergents or soaps are carried out, more of the flame retardant covering or coat will be removed completely from the carpet.

As indicated above, after a carpet or rug has been cleaned with a detergent one or more times, the flame proofing properties will of course have been substantially lost as a result of the detergent action on the flame proofing agent. Once the flame proofing effect was lost, there has been no practical way to replace the flame proofing effect short of removing the carpet or rug to an installation which had the facilities to retreat the carpets or rugs with flame proofing compositions. Therefore, because of the cost and time necessary to accomplish this, usually the carpets or rugs are used for the remainder of their life without further attention being paid to the flame proofing properties of the textiles. This is an especially troublesome problem in large institutions such as hotels, hospitals, and the like where a substantial amount of carpeting is maintained and which presents a significant peril in the event of a fire. The present invention provides a composition and a method of use which is designed to treat used carpets and rugs in place so that the flame proofing properties can be retained for the life of the textile.

An additional area which involves the same or a similar problem resides in walls, floors, ceilings and the like which are constructed of flammable materials such as foam rubber, various plastics and the like. The present invention provides a composition which can be used to simultaneously clean and fireproof surfaces of this type.

As indicated, the present invention is concerned with a composition which contains both a detergent and a fire proofing agent, which composition is used to effect cleaning of surfaces such as walls, carpets, rugs and the like and also places a new fire proofing or flame proofing film thereon. Therefore, the present composition and method of this invention are concerned with techniques by which a surface such as a wall, ceiling, floor, carpet or rug that has been in use for a period of time can be simultaneously cleaned with a detergent in order to remove dirt, grime and the like therefrom while at the same time placing a new fire proofing or flame proofing film thereon. Thus, the present invention overcomes the problems of the prior art in the removal of the flame proofing coatings during cleaning of surfaces such as carpets or rugs.

The composition for use in the method of the present invention comprises an aqueous composition containing an amine, a phosphorus acid, one or more fire proofing agents and a detergent. A preferred composition for use in the present invention is as follows:

| COMPONENT | AMOUNTS-PARTS BY WEIGHT |
|---|---|
| Amine | 40–60 wt. % |
| Phosphoric acid | 30–50 wt. % |
| Fire proofing agents | 35–60 wt. % |
| Detergent | 1–30 wt. % |
| Water | 250–550 wt. % |

A particular preferred composition would contain for about 400 parts of water, about 45–50 parts of amine, about 35–45 parts of phosphoric acid, about 30–50 parts fire proofing agents and about 15–25 parts of detergent.

The composition is preferably an aqueous composition which contains an excess of water or a water solution having a concentration of about 30–50%, preferably 35–40 wt. %. The mixture can also be prepared as a concentrate paste product by omitting the water from the reaction. A powder concentrate can be prepared by dehydrating the paste product.

The amine component used in the composition of the present invention may be an alkyl amine, aromatic amine, aralkyl amine or alkaryl amine. Especially preferred amines are the polyolamines, particularly the water soluble polyalkanol amines, such as those of the formula:

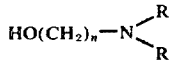

wherein R is hydrogen, a lower alkyl group, or a hydroxy lower alkyl group, and n is an integer of 1 to about 5. Thus the formula is inclusive of the simple polyolamines such as ethanolamine, diethanolamine and triethanolamine, mixtures thereof and the like. Triethanolamine is especially preferred as the amine component.

The composition of the present invention also contains phosphoric acid, preferably commercially available 85% phosphoric acid. The phosphoric acid is especially desirable over other inorganic acids as it provides the optimum pH range for the composition of about 5.5 to 6.5.

The fire proofing agents may comprise any of those well known in the art for this purpose including diammonium phosphate, monoammonium phosphate, ammonium salts of sulfamic acids such as ammonium sulfamate and the like. An especially preferred composition contains about 2 parts of diammonium phosphate and 1 part ammonium sulfamate.

The detergent composition employed as an essential component of the present invention is preferably any of the well known synthetic detergents including nonionic and anionic compositions. A highly preferred class of detergents are the alkali metal derivatives of aryl sulfonic acids, usually an alkali metal salt such as sodium benzene sulfonic acid. The aryl group may be further substituted by one or more alkyl substituents and mixtures of these detergents may also be used. A particularly satisfactory detergent composition of this type for use in the present invention is sold under the tradename "Nacconol", by Allied Chemical Corporation. "Nacconol" is a sodium alkyl aryl sulfonate.

Another group of useful detergents or wetting agents include those sold under the "Triton" tradename by Robin & Haas Co. Also there may be used the alkali metal alkyl sulfates and sulfonates such as sodium lauryl sulfate, dodecyl benzene sulfonate and tetradecyl benzene sodium sulfonate. Also there may be mentioned the alkali metal and ammonium salts of ethanolamine, the monoethers of polyethyleneglycol which contain a long chain lipophile group, the higher alkyl phenol poly lower alkoxy alkanols, the various alkali metal phosphates and the like. The well-known nonionic detergents available on the commercial market under the tradename "Pluronic" may also be used. In general, it may be stated that any detergent or wetting agent that is compatible with the other components of the system may be used.

The aqueous composition of this invention is prepared by initially mixing the water and the amine, preferably an alkanolamine, until good solution is obtained. Thereafter, the other components are added to obtain the final mixture or solution of the invention. The resulting solution will have a pH in the range of 5.5 to 6.5 and preferably about 6.0. The solution has good storage properties and may be stored in final mixed form for extended periods until ready for use. It may be diluted to any desired consistency by the addition of water.

In an alternative embodiment of the invention, a fire proofing shampoo composition can also be prepared which includes urea. In this composition, substantially equal parts by weight of urea and phosphoric acid are heated to boil off water at atmospheric pressure, about 90° to 115° C. After the water is removed, heating is continued until ammonia evolution begins (about 125°–130° C.) which can be detected by its odor. The mixture is then cooled, about twice the volume of water is added followed by about one-half the amount of the amine as used in the main composition (e.g. about 5–20 wt. %). To this mixture is then added about one-half to one weight percent of detergent. The resulting mixture has a pH of about 5.5 to 6.5 and is also useful as a combination fire proofing agent and cleaner. Obviously one or more fire proofing agents of the type described herein can also be added to this mixture.

The substrates to which the invention is applicable may be any surface such as a plastic, foam rubber, paper, wood and textiles such as carpets or rugs constructed by any known method. If the surface is a textile, it may be of the woven type consisting largely of fibrous material or it may be a tufted material in which the pile fibers are embedded in a nontextile backing, for example a rubber or resin backing. The fibers may be any of those known in construction of carpets and rugs including wool, cellulose, synthetic fibers such as polyamides, nylon, polyesters, polyolefins and polymers or copolymers of acrylonitrile as well as blends of fibers.

In use, the composition of the present invention may be applied by spraying, as from an aerosol can or other sprayer or with any of the well-known types of applicators. When applied to a carpet, it is applied in excess to the carpet or rug in sufficient amounts to saturate the surface while it remains in place on the floor or other surface. After saturating the rug or carpet, it may then be worked in by conventional shampooing methods, such as by a rotary shampoo machine. At this point, a wet sponge or the like may be used to soak up excess material which will contain dirt foamed from the fibers. After completion, the mixture is then allowed to dry. The resulting carpet or rug will contain a transparent flexible film on the fibers which is fire retardant.

On walls or other surfaces, it is preferred to apply the composition with a spray or cloth or paper towel as rubbing action is useful to clean the surface and apply an even film of the mixture. On removal of the excess and permitting to air dry an invisible fire-retardant film results.

As indicated, as a result of the treatment with the composition and method of this invention, there will be placed on the treated surface a transparent or invisible film which imparts sufficient fire retardant properties to the surface as to make it self-extinguishable in most situations. This film, while being sufficiently flexible to not effect the hand and durability of the surface, is sufficient to remain in place and not be substantially affected by wear or vacuuming and the like for a reasonable period so as to provide fire retardant properties over an extended period of time. In addition the fibers are cleaned, e.g. the mixture will remove Magic Marker colorant from a carpet after the first application of the film. The film can then be maintained by merely adding a dilute solution of the composition of the invention to the surface and allowing to dry. About a 10% solution of the active ingredients as a mixture in water has been found satisfactory for this purpose.

The following examples are presented to illustrate the preferred embodiments of the invention but it is not considered to be limited thereto.

EXAMPLE I

A composition was prepared by mixing 400 grams of water, and 52 grams of 99% triethanolamine at room temperature until solution was obtained. Thereafter, there was added to the composition the following components:

| | |
|---|---|
| 40 grams | 85% phosphoric acid |
| 30 grams | diammonium phosphate |
| 15 grams | ammonium sulfamate |
| 20 grams | "Nacconol", a sodium alkyl aryl sulfonate detergent |

The pH of the resulting solution was 6.0.

After the solution was complete, it was applied by a mechanical shampooer to 60" × 60" sections of carpets comprised of 100% nylon fibers and 100% wool. The rotary brushes of the mechanical shampooer worked the composition into the carpet and it was thereafter allowed to dry after removal of the excess solution on the surface.

After the mixture had dried on the carpet it was then checked for fire retardancy under the Flooring Radiant Panel Test of the National Bureau of Standards. The carpet sections were found to provide a substantially higher critical radiant flux than untreated carpets using a 5 minute preheat for both the wool and nylon.

EXAMPLE II

A composition was prepared by heating 90 parts by weight urea and 90 parts by weight 85% phosphoric acid at 115° C. until all water was removed. Thereafter heating was continued to 127° C. until NH$_3$ odor was detected. The mixture was then cooled and 300 parts water and 30 parts triethanolamine were added together with 1.0 wt. % of the detergent Nacconol (Allied Chemical Corporation). The pH of the mixture was 6.0. When applied to a nylon carpet and allowed to dry the mixture was found to have cleaned dirt from the fibers and to have placed a fire retardant film thereon.

The invention has been described herein with reference to certain preferred embodiments. However, as obvious variations thereon will become apparent to those skilled in the art, the invention is not to be considered as limited thereto.

What is claimed is:

1. A cleaning and fire-proofing composition comprising the reaction product of:
    a. 40–60 parts by weight of a polyalkanol amine;
    b. 30–50 parts by weight of phosphoric acid;
    c. 35–60 parts by weight of a fire-proofing agent selected from the group consisting of monoammonium phoshate, diammonium phoshate and ammonium salts of sulfamic acid;
    d. 1–30 parts by weight of a detergent selected from the group consisting of alkali metal derivatives of aryl sulfonic acids, alkali metal alkyl sulfates, alkali metal alkyl sulfonates, alkali metal and ammonium salts of ethanolamine, the monoethers of polyethylene glycol which contain a long chain lipophile group, the higher alkyl phenol polylower alkoxy alkanols, alkali metal phosphates, and mixtures thereof; and
    e. 250–550 parts by weight of water; said composition having a pH in the range of 5.5 to 6.5.

2. A composition according to claim 1, wherein the amine is an alkanolamine of the formula:

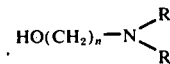

where R is hydrogen, an alkyl group, or a hydroxy lower alkyl group, and n is an integer of 1–5.

3. A composition according to claim 1, wherein the detergent is an alkali metal salt of an alkyl aryl sulfonate.

4. A composition according to claim 1, wherein the amine is triethanolamine, the inorganic acid is 85% phosphoric acid, the fire-proofing agent comprises a mixture of diammonium phosphate and ammonium sulfamate, and the detergent is a sodium alkyl aryl sulfonate.

* * * * *